United States Patent [19]

Dashiell et al.

[11] Patent Number: 4,479,977

[45] Date of Patent: Oct. 30, 1984

[54] METHOD OF PREPARING HEAT RESISTANT LECITHIN RELEASE AGENT

[75] Inventors: Gregory L. Dashiell; William E. Prosise, both of Fort Wayne, Ind.

[73] Assignee: Central Soya Company, Inc., Fort Wayne, Ind.

[21] Appl. No.: 454,846

[22] Filed: Dec. 30, 1982

[51] Int. Cl.$^3$ ............................. A23J 7/02; A23D 5/00
[52] U.S. Cl. ................................ 426/609; 426/662; 426/811; 260/403
[58] Field of Search ................... 426/609, 662, 811; 260/403; 106/244

[56] References Cited

U.S. PATENT DOCUMENTS

| | | | |
|---|---|---|---|
| 2,629,662 | 2/1953 | Julian et al. | 426/662 |
| 3,301,881 | 1/1967 | Davis | 426/662 X |
| 3,821,007 | 6/1974 | Carey | 426/609 X |
| 4,034,124 | 7/1977 | van Dam | 426/662 X |
| 4,142,003 | 2/1979 | Sejpal | 426/609 X |
| 4,155,770 | 5/1979 | Doumani | 426/609 X |
| 4,188,412 | 2/1980 | Sejpal | 426/609 |
| 4,192,898 | 3/1980 | Hanson, Sr. | 426/609 X |
| 4,371,451 | 2/1983 | Scotti et al. | 426/811 X |

*Primary Examiner*—Robert Yoncoskie
*Attorney, Agent, or Firm*—Tilton, Fallon, Lungmus & Chestnut

[57] ABSTRACT

A clear heat resistant lecithin is produced by acylating lecithin to less than 1.2 mg nitrogen per gram, adjusting the pH to the range of 7.5–9.0 and fluidizing with suitable diluents for use as a release agent for diverse applications.

4 Claims, No Drawings

METHOD OF PREPARING HEAT RESISTANT LECITHIN RELEASE AGENT

BACKGROUND OF THE INVENTION

This invention relates to the preparation of lecithin-based release agents. More specifically, the release agents are formulated using lecithin prepared in a way that gives it new and unique properties. This specially prepared lecithin is a clear fluid that will resist heat induced darkening and maintain functionality longer than commercially available lecithins, when incorporated into a release agent.

Phosphatide Release Agents With Improved Heat Tolerance

Commercial phosphatide mixtures (commonly referred to as lecithin) have been widely sold as the active components of cooking surface release agents. These release agents promote the rapid and complete release of food from the cooking surface. Thus, the advantages to users of cooking release agents reside in enhanced food product integrity, increased product yield, reduced clean-up time, and thus greater convenience. Many pan release agents, baking release agents, surface lubricants, griddle frying fats and oils, and pan frying fats and oils contain a commercial phosphatide product as the active release component. Previous work in the area is listed as follows:

1. U.S. Pat. No. 4,142,003, Sejpal; Low viscosity, lecithin-vegetable oil release agents incorporating 1-15% of 190 or 200 proof ethanol.
2. U.S. Pat. No. 4,108,678, Szuhaj and Yaste; Release agents consisting of lecithin, alcohol, and a mixture of triglycol esters.
3. U.S. Pat. No. 4,127,419, Szuhaj and Yaste; Release agents consisting of lecithin, tri-glycol ester(s), alcohol, and water.
4. U.S. Pat. No. 3,896,975, Follmer; Lecithin emulsion applied from a pressurized system as a cooking lubricant.
5. U.S. Pat. No. 3,821,007, Carey; A lecithin containing aerosol release material comprising, vegetable shortening, vegetable oil, lecithin and wheat and soybean flour.
6. U.S. Pat. No. 3,661,605, Rubin and Mayerhof; An aerosol release agent composed of an homogenized dispersion of lecithin and water.

A number of properties are desirable in a commmercial lecithin sold for incorporation into a cooking surface release agent. Good clarity is advantageous when the lecithin is to be used as the active component in a low viscosity formula (i.e., a liquid oil-based formula). Poor clarity is generally the result of a small quantity of minute residual insolubles. Generally, these are artifacts of processing methods. The insolubles will settle out of the low viscosity release agent upon standing, leading to an insoulubles-rich fraction unsuitable for use, due to decreased functionality. These insolubes may also plug nozzles if spraying is attempted.

Good fluidity of commercial lecithins can also be marketed to advantage. If incorporated into finished cooking surface release products, low viscosity lecithins are easier to handle, and can be mixed with other components more easily than highly viscous lecithin products. If used directly, low viscosity lecithins can be more functional, as well as more easily applied by spraying.

It is also an advantage for the lecithins to remain evenly dispersed in the commercial release agent over the shelf life of the product. In addition, the lecithin products for incorporation into release agents should also possess storage stability against phase separation, oiling off, and formations of insolubles or haziness over a range of storage conditions. Examples of commercial lecithin products having good clarity, proper fluidity, and storage stability are CENTROPHASE ® and CENTROL ® lecithins available from Central Soya Company, Inc., and YELKIN ® PRA from Archer Daniels Midland Company.

A problem with all commercial lecithin-based release agents is the loss of chemical integrity which occurs during heating. This problem, manifested as the familiar darkening and eventual formation of insoluable black/brown pigments and the evolution of objectionable odors, can be traced to a number of complex reactions between or within phosphatide molecules, or between phosphatides and other minor components of commercial soy lecithin.

Several approaches have been taken to reduce or eliminate the heat susceptibility of lecithin-based cooking agents. Japanese Pat. Nos. 79,107,530 and 79,110,210 (Matsueda, et al) describe a process wherein the heat-induced darkening of a lecithin-containing cooking agent is substantially reduced by the incorporation of a carbon dioxide generating compound. This process burdens its success with some serious side effects. A large quantity of insoluble compound remains dispersed as sediment in the agent, yielding a cloudy multiphase product that can plug spray nozzles, if spray application to a cooking surface is attempted. A filtering step would be required to produce a commercially acceptable product. Perhaps more importantly, during heating a disagreeable "fishy" odor is evolved.

Suzuka, et al reveals in Japanese Pat. No. 79,127,907 a process wherein a mixture of three parts lecithin and one hundred parts corn oil was treated with succinic acid to reduce lecithin discoloration during heating. Again, an insoluble residue was left in the product; filtering would be required to produce a commercially acceptable product.

The teachings of Matsueda and Suzuka treat the lecithin bearing release formulation, rather than the lecithin itself. These methods would pose formidable technical problems for direct lecithin treatment due to the higher viscosity of the lecithin and the high proportions of chemical additive needed.

In view of the teachings of Suzuka, et al, Pat. No. 79,127,907 showing the ability of succinic acid treated product for reducing discoloration in a lecithin intended for antispattering applications, it was decided to try the procedure of co-owned Davis U.S. Pat. No. 3,301,881 because of analogy in the chemical treatment. The product of the Davis patent is marketed as CENTROL ®-CA for emulsifying uses.

Upon trying the Davis teaching, however, it was found that the conditions specified therein were not effective to achieve the intended objective. Our first effort was to obtain improvement by varying the degree of acylation; this alone was found to be ineffective. As customary for flavor, oxidative stability, and for the sake of compatibility with food systems, neutralization of the various reacted products was carried out. To our surprise, increase in pH resulted in diminution of discoloration during heating. The idea then occurred to us to try extending pH into the alkaline range, and further improvements were noticed. This is contrary to experience in food technology, since increased pH usually results in higher color intensities (e.g., Maillard reaction).

SUMMARY OF INVENTION

The subject invention includes an improved means of ameliorating the heat susceptibility of lecithin containing release agents.

Employing the method of modifying phosphatides, as described by Davis U.S Pat. No. 3,301,881, and especially with modification ranges of a more specific nature, lecithin-based release agents with superior resistance to darkening, reduced production of objectionable odors, and retention of chemical integrity are produced. The advantage becomes increasingly evident at higher temperatures and longer heating times, as indicated in the accompanying examples.

DETAILED DESCRIPTION

Lecithin is modified by adding 2-5% of an organic anhydride (acetic anhydride is ideal) to a lecithin hydrate. Lechithin hydrates are obtained during the degumming of crude soybean oil. The amount of organic anhydride needed generally depends on the level of phosphatides in the gums. Sufficient organic anhydride should be added so that the final product will have, but not be limited to, an amine nitrogen content of about 1.2 mg nitrogen or less per gram of product. Amine nitrogen is determined by formol titration, as described in U.S. Pat. No. 3,301,881.

Following the reaction with organic anhydride, a dilute solution (1-30%) of an alkali (15% NaOH or KOH are ideal) is added to raise the pH to 7.5-9.0, preferably 7.5 to 8.5. The product is then vacuum-dried at 28" Hg vacuum and 150°-250° F. to a final moisture within Food Chemicals Codex (FCC) III lecithin specifications. This processing method allows the resulting product to be clear.

Fluidity and phase stability are established via the addition of fatty acids and soybean salad oil (or other oleaginous oils) to a percent acetone insolubles (AI) of about 50-66% (optimally 55%) and to less than 36 acid value (AV) which complies with the FCC definition for lecithin (Acetone Insolubles and Acid Value are FCC III methods). The final product will have viscosities in the range of 1,000-10,000 centipoise (optimally 2000-3000), (Brookfield LVT, Brookfield Engineering Company, Spindle 4, 30 rpm, 25° C.). These products maintain a clear single phase upon storage from −30° F. to 150° F.

It is well known that darkening reactions involving amines are favored at higher pH's (Eskin-Biochem of Foods, 1971). What was surprising was our discovery that acylated samples made alkaline had a greater resistance to darkening than their acidic or neutral counterparts. While increasing alkaline pH seems to best inhibit the darkening reaction, the allowable adjustments are limited by the need to avoid well understood alkali catalyzed saponification of the lecithin.

The Davis patent (U.S. Pat. No. 3,301,881) specifically addresses the means to increase the hydrophilicity of commercial lecithins, while controlling the viscosity. In so doing, the lecithin becomes a suitable emulsifier for oil-in-water emulsions. The desirable ranges for analytical values of product produced according to Davis, and the reagents used to obtain product with these analytical values, clearly did not suggest the use of these products to function as release agents. At levels of amine nitrogen in the range of 1.4-1.7, and with products of pH 6.5-7.0, inferior and unacceptable resistance to heat is obtained. Additionally, the use of salts and bases of alkaline earths to adjust pH and control fluidity have a deleterious effect on product clarity and phase stability.

A wide variety of cooking release agents can be formulated with heat resistant lecithins. The simplest lecithin-based release agents consist of blends of one or several oils together with lecithin. Lecithin is generally present in these formulations at 1-10% phosphatides. These variations reflect specific end user needs, such as cooking temperature, form and composition of the product to be released, and the required shelf stability of the release agent. In these formulations, the acylated, pH adjusted product performs superior to present commercial products, because of its decreased susceptibility to heat. Additionally, the invention product can be incorporated into low viscosity products containing special solvents and propellants. These products are popular in the retail trade.

The following examples demonstrate the enhanced functionality and increased utility of acylated, pH adjusted products in the formation of lecithin-based release agents.

EXAMPLE 1

The following data illustrate the effect acylation level has on the resistance of lecithin-based cooking release agents to heat. Three samples were prepared as follows:

a. As a control 225 grams of lecithin hydrate containing 33% moisture was mixed with 0.4 gram of NaOH (10% solution) for 30 minutes at 120° F. The product was then dried at 29" Hg vacuum to a final temperature of 170° F. Product was adjusted to target AI and AV values as set forth in Table I following with soy fatty acids and soybean salad oil.

b. 225 grams of lecithin hydrate containing 33% moisture was equilibrated to 120° F. One gram of acetic anhydride was added dropwise to the mixing hydrate and allowed to react for 30 minutes. 0.97 gram of NaOH (10% solution) was then added dropwise to the gums during mixing. After 30 minutes, the product was dried and AI and AV adjusted as above.

c. 225 grams of lecithin hydrate as above was treated as in (b), except 2.5 grams of acetic anhydride was added and 1.24 grams of NaOH was added. Product was dried and AI and AV adjusted as above.

The samples were adjusted to obtain the following values:

TABLE I

| SAMPLE | AI[1] | AV[2] | AMINE N[3] | PH[4] | VISCOSITY[5] |
|--------|------|------|-----------|------|-------------|
| a. | 55.9 | 22.8 | 1.89 | 7.9 | 2370 |
| b. | 56.9 | 21.0 | 1.50 | 7.8 | 2520 |
| c. | 56.5 | 18.3 | 1.07 | 7.9 | 2380 |

[1]Food Chemicals Codex III Method For Lecithin Acetone-Insoluble Matter (Phosphatides) page 167
[2]Food Chemicals Codex III Method For Lecithin Acid Value page 167
[3]Per U.S. 3,301,881
[4]1% in 10% aqueous Ethanol
[5]Brookfield LVT, Spindle 3 Brookfield Engineering Co.

Samples were completely dispersed in soybean salad oil to give 2% AI. The resistance to heat was tested by placing 12 ml of the above mixtures onto the cooking surface of an electric griddle preheated to a temperature as prescribed below. Color changes over time were measured by Gardner color standards (American Oil Chemists Society Method Td 1a-64). The evolution of objectionable odors was measured by organoleptic evaluation.

| GARDNER COLOR AFTER HEATING AT 340° F. FOR TIME INDICATED | | | | |
|---|---|---|---|---|
| | | HEATING TIME | | |
| SAMPLE | 0 MINUTE | 10 MINUTES | 20 MINUTES | 30 MINUTES |
| a. | 7 | 18+* | — | — |
| b. | 7+ | 14 | 16— | 16 |
| c. | 7+ | 13 | 13 | 13 |

*Too dark to read.

| GARDNER COLOR AFTER HEATING AT 400° F. FOR TIME INDICATED | | | | |
|---|---|---|---|---|
| | | HEATING TIME | | |
| SAMPLE | 0 MINUTE | 10 MINUTES | 20 MINUTES | 30 MINUTES |
| a. | 7 | 18+* | — | — |
| b. | 7+ | 18+* | — | — |
| c. | 7+ | 17— | 18— | — |

*Too dark to read.

The resistance to color change is greater with more highly acylated sample c. Sample a. shows little resistance to heat-induced darkening. The sample b. which is in the allowable range of the Davis patent shows marginal resistance at 340° F. and unacceptable resistance at 400° F. No objectionable odors were evolved in sample c. Other samples gave off "fishy" or "Amine-type" odors typical of commercial lecithins.

EXAMPLE 2

The following example illustrates the effect of pH at a constant degree of acylation (level of amine nitrogen).

A single-bleached lecithin hydrate was acylated with 4% acetic anhydride to an amine nitrogen of 0.6 mg per gram, according to the procedure of Example 1. Samples of the hydrate were then reacted with 10% NaOH to give the target pH listed in the table below. Products were dried to a moisture level of less than 1%. Samples were diluted to 62% AI with soybean oil to facilitate handling.

Samples were further diluted and heat resistance was tested as in Example 1. The following results were obtained.

| COLOR OF PAN OIL/RELEASE AGENT AT DIFFERENT pH LEVELS WITH A CONSTANT LEVEL OF ACYLATION[1] | |
|---|---|
| SAMPLE pH[2] | GARDNER COLOR[3] |
| 4.8 | 18— |
| 6.3 | 16 |
| 7.5 | 14 |
| 9.0 | 12+ |
| Control[4] | 18 |

[1] All lecithins at 0.6 mg N/g lecithin.
[2] 1% in 10% Ethanol at room temperature.
[3] Five minutes heating at 340° F.
[4] pH 7.4, no acylation.

The effect of increasing pH to reduce darkening is evident. At the lowest pH, the acylation itself has little effect towards improving product resistance to darkening.

EXAMPLE 3

The results of Example 2 were duplicated using KOH instead of NaOH as the neutralizing reagent.

EXAMPLE 4

The following example illustrates the utility of this invention as an improved release agent during prolonged heating of a food product.

An electric skillet was treated with a thin film of pan oil formulated with various lecithins at 2% acetone insolubles in a base of soybean salad oil. The skillet was heated for 30 minutes at 350° F. Pancake batter was then added to the skillet to cover an area approximately four inches in diameter. After frying for 2 minutes on each side (package directions), the pancakes were removed. Pancakes were evaluated for appearance, ease of release and skilled examination for cleanliness and ease of cleanup. The pan coated with the subject invention yielded a pancake with an intact, more wholesome light golden brown appearance. All lecithins released equally.

| | PANCAKE APPEARANCE | RELEASE | PAN CLEANLINES |
|---|---|---|---|
| Commercial Lecithin A | Brown | Good | Dark & Coated |
| Commercial Lecithin B | Brown | Good | Dark & Coated |
| Acylated to 0.6 mg N/g, pH 7.5 | Light Golden Brown | Good | Clear |
| Acylated to 1.5 mg N/g, pH 7.6 | Dark Golden Brown | Good | Dark & Coated |
| Acylated to 0.6 mg N/g, pH 6.5 | Dark Golden | Good | Dark & Coated |

EXAMPLE 5

This example demonstrates the suitable stability against separation of acylated, pH adjusted lecithins when incorporated into various lecithin-based release products. The lecithins listed below were evaluated at 2, 5, 10 and 25% levels in refined soybean oil.
Commercial Lecithin A
Commercial Lecithin B
Acylated to 0.6, adjusted to pH 7.5

The lecithins were formulated into release agents by blending into refined soybean oil at the prescribed levels using a laboratory stirrer. Blending was done at 140° F. for fifteen minutes.

After blending, the pan oils were placed in four ounce sample jars, sealed, and stored at room temperature in the dark. The stability of the lecithin in the oil was observed.

All samples were stable at 2% and 5% lecithin content for at least one week. At levels of greater than 5%, the stability against separation of the release agents containing acylated, pH adjusted lecithin was found to be equivalent to commercial lecithins.

EXAMPLE 6

The following demonstrates the suitability for incorporating acylated, pH adjusted lecithin into low viscosity release formulae containing solvents such as ethanol or hydrocarbon carrier propellants. Lecithins were incorporated into a pump spray release formulation prepared according to U.S. Pat. No. 4,142,003 (Sejpal, V. D.) and having the following composition:
Lecithin[1]: 10%
Soybean Oil: 80%
Ethanol (190 proof): 10%

[1]Lecithins used: Commercial A, Commercial B, Acylated, Amine N=1.0 mg/g, pH 7.5.

All products produced clear, stable, low viscosity (less than 100 cP) fluids. When tested in ovens on a cookie sheet at 300°, 350°, and 400° F., the acylated product showed superior resistance to darkening.

EXAMPLE 7

An electric skillet was heated to about 350° F. and sprayed with a thin coating of release agent from a pump spray bottle. The release agents were formulated as indicated below:

1. 10% 190° proof Ethanol, 10% lecithin with 0.7 mg N/g, and pH 7.9 and 80% liquid vegetable oil. The final release agent contained about 5% AI.
2. 10% 190° proof ethanol, 10% lecithin sold for use in release agents and 80% liquid vegetable oil. The final release agent contained about 5% AI.
3. A commercially available release agent containing lecithin sufficient to give 3-4% AI, about 10% ethanol, and the balance of a liquid vegetable oil.

The skillet coated with release agent was allowed to heat for 2 minutes to allow for evaporation of the ethanol at which time a raw egg was placed in the pan and fried on both sides for about 1 minute. The eggs were removed and evaluated for appearance.

Release agents described in 2 and 3 yielded eggs which released easily but had a dark oil surface appearance which was particularly noticeable on the side of the egg initially down in the skillet. The release agent described in 1 caused the egg to release easily, but had a more wholesome yellow oily appearance. Acceptable vegetable oils for these formulations include those of the $C_{16}$-$C_{18}$ type such as soybean, cottonseed, safflower, peanut.

EXAMPLE 8

The following example shows the resistance to darkening of lecithin based release agents formulated from liquid vegetable oil and various levels of acylated, pH adjusted lecithins. Lecithins were blended into liquid oil to provide from 1 to 10% acetone insoluble material in the release agent. Twelve ml were then placed in an electric skillet pre-heated to 350° F. and heated for 5 minutes. The sample was removed from the pan, allowed to cool, and then diluted 3 parts release agent to 4 parts chloroform. The material was then transferred to color tubes and compared to Gardner color standards. Results are given below:

| Lecithin Type | % AI in Release Agent | | | | |
|---|---|---|---|---|---|
|  | 1.0 | 2.5 | 5.0 | 7.5 | 10.0 |
| Control-Commercial lecithin, Amine N = 1.9 mg/g pH = 6.9 | 13− | 17− | a | a | a |
| Acylated, pH adjusted Amine N = 0.7 mg/g, pH = 7.9 | 6− | 11− | 13− | 14 | — |
| Acylated pH Adjusted Amine N = 1.2 mg/g pH = 7.7 | 7+ | 12− | 13+ | 15− | 17− |

$^a$Off scale, too dark to read; burnt odor.

This data demonstrates the improved heat resistance of lecithin based release agents over a wide range of acetone insolubles. The level of acetone insolubles in the release agent (determined by how much lecithin is added) as well as the pH and amine nitrogen content of the lecithin employed is important in determining how much the release agent darkens.

EXAMPLE 9

Ethanol can be used in some retail lecithin-based release agents to reduce viscosity and cohesiveness, thus allowing for easier material atomization and making them suitable for dispensing by pump sprays, aerosols and the like.

The following example illustrates the compatibility of heat resistant lecithin based release formulas containing ethanol and suitable for dispensing via pump sprays or aerosol devices.

A lecithin product containing about 50% acetone insolubles and having a amine nitrogen of 0.7 mg/g and a pH of 7.9 was blended with liquid vegetable oil (chosen from among soybean, cottonseed, peanut, and safflower oil) at 120° F. and mixed with various proportions of 190° or 200° pf ethanol. Samples were judged for clarity and maintenance of a single phase demeanor upon standing at room temperature. The following results were obtained.

| Formula No. | 1 | 2 | 3 | 4 | 5 | 6 | 7 | 8 | 9 | 10 | 11 | 12 |
|---|---|---|---|---|---|---|---|---|---|---|---|---|
| Lecithin | 2% | 2% | 5% | 5% | 5% | 5% | 10% | 10% | 15% | 15% | 15% | 15% |
| Liquid Veg. Oil | 96% | 93% | 90% | 85% | 90% | 85% | 85% | 80% | 77% | 75% | 70% | 70% |
| Ethanol 190° C. pf | 2% | 5% | 5% | 10% | — | 5% | 10% | 8% | 10% | — | 15% | — |
| Ethanol 200 pf | — | — | — | — | 5% | 10% | — | — | — | — | 15% | — |
| Clarity | a | b | a | b | a | a | a | a | a | a | b | b |
| Phases | c | d | c | d | c | c | c | c | c | c | d | d | a Clear
b White, milky
c Single phase
d Separated into 2 or more phases.

All of the above formulas with the acceptable clarity and phase stability had viscosities less than 100 centipoise (Brookfield LVT, spindle 2, 30 rpm) and are suitable for dispensing by pump spray applicator or similar spray application device.

The level of 190° proof ethanol in the formula is generally limited to a ratio equal in weight to the lecithin in the formula and should not exceed 10% of the total formula weight.

EXAMPLE 10

Compression molds used to cast dies for punch press processing were sprayed with a 15mμ thick coating of the following release agents (R.A.):

R.A. #1—3% Commercial lecithin in Soybean Oil
R.A. #2—3% Acylated (0.6 mgN/g), pH 7.5 in Soybean Oil
R.A. #3—3% Acylated (0.6 mgN/g), pH 6.5 in Soybean Oil
R.A. #4—3% Acylated (1.5 mgN/g), pH 7.6 in Soybean Oil.

A commercially available epoxy molding mixture was filled into the mold under 150 kg/cm² pressure at 320° F. and held for four minutes to cure. This was then cooled to about 100° F. and the coatings were removed from the molds. All castings were found to release equally.

The interior of the molds were evaluated for cleanliness. The mold that had been sprayed with R.A. #2 appeared much cleaner than molds sprayed with R.A.'s #1, 3, and 4 which were coated with dark, burnt-smelling coating.

While in the foregoing specification, detailed descriptions of embodiments of the invention have been set down for the purpose of illustration, many variations may be made in the details hereingiven without departing from the spirit and scope of the invention.

We claim:

1. A method of preparing a lecithin-based release product comprising acylating lecithin with an organic anhydride to provide an acylated lecithin having less than about 1.2 mg nitrogen per gram of said acylated lecithin, adding an alkali hydroxide to said acylated lecithin to achieve a pH in the range of about 7.5 to about 9.0 in the pH adjusted acylated lecithin, drying said pH adjusted acylated lecithin and adding thereto a mixture of soy fatty acids and edible oils to achieve a visually clear product having a viscosity of about 1,000 to 10,000 centipoise, a percent acetone insolubles of about 50 to about 66 and an acid value of less than about 36 effective to increase the resistance to heat induced darkening.

2. The method of claim 1 in which the dilution with oleaginous material provides an acetone insolubles in the range of about 1% to about 10% whereby said product is suitable for use as a release agent.

3. The method of claim 2 in which said agent is further containerized with a carrier selected from the class consisting of ethanol and hydrocarbon propellants.

4. A method of preparing a lecithin-based release product comprising acylating lecithin with an organic anhydride to provide an acylated lecithin having less than about 1.2 mg nitrogen per gram of said acylated lecithin, adding an alkali hydroxide to said acylated lecithin to achieve a pH in the range of about 7.5 to about 8.5 in the pH adjusted acylated lecithin, drying said pH adjusted acylated lecithin and adding thereto a mixture of soy fatty acids and edible oils to achieve a product having a viscosity of about 1,000 to 10,000 centipoise, a percent acetone insolubles of about 50 to about 66 and an acid value of less than about 36 and thereafter diluting said product with an oleaginous material to provide an acetone insolubles value in the range of about 1% to about 10% characterized by resistance to heat-induced darkening and degradation.

* * * * *